(12) United States Patent
Reininger

(10) Patent No.: US 7,376,314 B2
(45) Date of Patent: May 20, 2008

(54) FIBER COUPLED ARTIFICIAL COMPOUND EYE

(75) Inventor: Francis Mark Reininger, Tujunga, CA (US)

(73) Assignee: Spectral Imaging Laboratory, Pasadena, CA (US)

( * ) Notice: Subject to any disclaimer, the term of this patent is extended or adjusted under 35 U.S.C. 154(b) by 0 days.

(21) Appl. No.: 11/717,971

(22) Filed: Mar. 14, 2007

(65) Prior Publication Data

US 2007/0237490 A1  Oct. 11, 2007

Related U.S. Application Data

(60) Provisional application No. 60/784,664, filed on Mar. 22, 2006.

(51) Int. Cl.
*G02B 6/26* (2006.01)

(52) U.S. Cl. ..................... 385/116; 385/147
(58) Field of Classification Search ............... 385/116, 385/147
See application file for complete search history.

(56) References Cited

U.S. PATENT DOCUMENTS

| | | | |
|---|---|---|---|
| 3,589,798 A | 6/1971 | Ogura | |
| 4,357,088 A * | 11/1982 | Pomerantzeff | 396/18 |
| 6,449,103 B1 * | 9/2002 | Charles | 359/725 |
| 6,571,043 B1 * | 5/2003 | Lowry et al. | 385/120 |
| 6,898,015 B2 | 5/2005 | Yoshikawa | |
| 6,933,167 B2 | 8/2005 | Yamamoto | |
| 6,942,959 B2 | 9/2005 | Dubin | |
| 6,967,779 B2 | 11/2005 | Fadel | |
| 7,106,529 B2 | 9/2006 | Kerr | |
| 7,119,962 B2 | 10/2006 | Gurevich | |
| 7,184,090 B2 | 2/2007 | Watanabe | |
| 7,187,502 B2 | 3/2007 | Gurevich | |
| 7,217,573 B1 * | 5/2007 | Oshida et al. | 436/94 |
| 7,286,295 B1 * | 10/2007 | Sweatt et al. | 359/619 |

OTHER PUBLICATIONS

Land and Nilsson, "Animal Eyes", Oxford University Press, England 2002.
Duparrú et al., "Artificial Apposition Compound Eyes Fabricated by Micro-Optics Technology", Applied Optics, Aug. 2004, pp. 4303-4310, vol. 43, No. 22.
Lee and Szema, "Inspirations from Biological Optics for Advanced Photonic Systems", Science, Nov. 2005, pp. 1148-1150, vol. 310, No. 5751.

* cited by examiner

*Primary Examiner*—Ellen Kim

(57) ABSTRACT

A multiple aperture array, wide angle imaging system incorporates compound refractive optics modeled after the eyes of insects. The system channels light through the apertures of a convex spatial filter and a pair of lenslet arrays hot press molded on a positive meniscus form. The lenslets act as afocal Keplerian telescopes to superpose light from hundreds of adjacent channels to a common point on the convex surface of a fiber optic imaging taper. The superposed light from all the channels form a curved, high intensity image that is transformed by the taper into a flat format for readout by a mosaic detector array. The image is upright and distortion free with an infinite depth of field. Ghost images are blocked by a honeycomb louver baffle positioned between the lenslets and the imaging taper. The system is conformable to the geometry of any convex mounting surface, whether spherical, aspherical, or cylindrical.

19 Claims, 16 Drawing Sheets

| Superposition Imaging System Optical Prescription for B270 Glass |||||||||||
|---|---|---|---|---|---|---|---|---|---|---|
| Part Reference: | 44 | 46 | 48 | 50 | 51 | 52 | 54 | 56 | 58 | 60 |
| Part Specification: | 5 mm | 0.871 mm | 37 mm | 0.871 mm | 16 mm | 52 mm | 0.45 deg | 0.335 mm | 0.290 mm | 5 mm |

FIBER COUPLED ARTIFICIAL COMPOUND EYE

RELATED APPLICATIONS

The present application is a continuation-in-part application of U.S. provisional patent application Ser. No. 60/784,664, filed Mar. 22, 2006, for FIBER COUPLED ARTIFICAL COMPOUND EYE, by Francis M. Reininger, included by reference herein and for which benefit of the priority date is hereby claimed.

FIELD OF THE INVENTION

The present invention relates to wide angle imaging systems and, more particularly, to multiple aperture wide angle imaging systems that have curved lenslet arrays.

BACKGROUND OF THE INVENTION

Conventional camera systems are modeled after the single aperture eyes of vertebrates. Single aperture eyes have the advantage of good spatial resolution and good light capture efficiency, but they are disadvantaged by their relatively large size and limited field of view. Vertebrates evolved to overcome the field of view limitation by gimbaling the eye in its socket. Camera developers have overcome the field of view limitation by inventing wide angle lenses modeled after a fish eye. Unfortunately the "fish eye lens" distorts the image, making square objects appear round. The fish eye lens also requires many additional optical elements to control optical aberrations, making the lens expensive, heavy, and long. An example of a wide angle fish eye lens is described by Ogura in U.S. Pat. No. 3,589,798. The lens is over 6 inches long ans uses 10 powered optical elements of different sizes, shapes, and materials.

Another disadvantage of the conventional single aperture lens is its need for focus adjustment to image objects at different distances. The problem is especially acute at close range and has prompted inventors to adopt various schemes to automate the focus adjustment process. One example of an auto focus system is described by Watanabe et al. in U.S. Pat. No. 7,184,090. It engages in a focusing operation while sending out an image-capturing signal. It then settles on the focus position that achieves the highest value in image contrast. As with all such auto focusing schemes, it cannot overcome the inherent design limitation of a single aperture lens: objects at different depths of field cannot be brought into focus simultaneously.

There is the need in many autonomous surveillance, tracking, and navigation applications for a distortion free, wide angle imaging system that remains in focus through all depths of field. Such a system would likely be modeled after the most popular eyes found in nature, the multiple aperture compound eyes of arthropods (i.e. insects and crustaceans). Compound eyes have an extremely wide, undistorted field of view with an infinite depth of field. Compound eyes are distortion free because the field of view and the entrance pupil are separated into tiny zones that are focused independently from each other using an array of micro-lenses (or lenslets). There is no need for focus adjustment because the apertures of these lenslets are extremely small relative to the size of the object and its depth of field. As with a pinhole camera, each aperture captures a very small section of the optical wavefront emanating from the object. The smaller the wavefront section, the flatter it becomes until all objects appear to be at infinity. This is why arthropods have no need for a focusing mechanism.

Compound eyes have the added benefit of being built as convex structures around the outside of the animal's head, making them inherently small and light weight. The ideal artificial compound eye would be conformable to the geometry of its mounting surface and retain the wide angle, focus free, distortion free attributes found in nature. In practice, a conformal artificial compound eye could be shaped to the form of an aircraft wing, nose cone, or fuselage so as not to disrupt the air flowing over it. This would be of great benefit to a micro-aircraft because the artificial compound eye would be part of the aircraft structure, displacing no more volume or mass than necessary. The distortion free, wide angle viewing capability would enable the aircraft to fly autonomously inside buildings, tunnels, and caves using the optical flow field for navigation and guidance. All objects in the flow field would remain in proper focus and shape at all ranges, thereby allowing the aircraft to make real-time avoidance maneuvers.

The concept of an artificial compound eye is not new. Duparré et al. describe a flat lenslet array artificial compound eye the size and shape of a credit card (see Duparré et al., Applied Optics, August 2004, pp 4303-4310, vol. 43, No. 22). The flat design attribute is beneficial in that it enables the use of flat lenslet arrays, which are readily manufactured in a variety of ways (see for example Fadel et al., U.S. Pat. No. 6,967,779). The flat design also matches well to flat mosaic detector arrays, which are also easy to manufacture and readily available. However, the flat design attribute limits the field of view to only 21 degrees in this case. More importantly, the concept is a flat variant of the apposition array compound eyes found in diurnal arthropods (i.e. flies, bees, and butterflies). In an apposition array imaging system the light collection efficiency is equal to the area of the aperture of an individual lenslet. This limits the light collection efficiency considerably, and is why diurnal arthropods require daylight for viewing. Another variation of a flat lenslet array system is described by Gurevich et al. in U.S. Pat. No. 7,187,502. This system uses a second flat lenslet array of a different pitch to increase the magnification of the image. The system was invented for imaging "remotely located objects, i.e., objects located behind the focal distance of the assembly". Though the flat lenslet arrays described in these inventions are readily available, a curved lenslet array that can be made to any shape would be desirable for making the system conformal to its mounting structure.

Lee and Szema describe an artificial apposition array compound eye that closely mimics the design found in nature (see Lee and Szema, Science, November 2005, pp 1148-1150, vol. 310, No. 5751). The lenslet array is convex in shape, and the light from each lenslet is focused onto a convex surface. Unfortunately, the design requires a convex shaped detector array of extremely small size to capture the image. Even if such a detector array could be made, it would be difficult and expensive to manufacture, and its curvature would need to match the curvature of the lenslet array. The publication by Lee and Szema does not display an image generated by the artificial compound eye they describe, which might be due to problem of finding a proper detector for it. If an image could be captured, its intensity would be very low because it is an apposition array system.

The image intensity can be increased by several orders of magnitude by adopting the more sophisticated superposition compound eye design of nocturnal arthropods, such as moths and beetles. In the superposition compound eye, lenslets are designed to operate as afocal Keplerian telescopes on a convex, meniscus form. This enables thousands of lenslets to work together to bring light to a common point on the convex image capture surface. In the case of a moth eye, its superposition design increases its light collection efficiency by 1000 times that of a butterfly eye, which is why moths are nocturnal and butterflies are diurnal. The challenge then is to create an artificial superposition compound eye that mimics the eye of a moth. In that way its light collection efficiency would rival that of a conventional single aperture imaging system, or even surpass it.

U.S. PATENT DOCUMENTS

| | | |
|---|---|---|
| 3,589,798 | Jun. 29, 1971 | Ogura |
| 6,898,015 | May 24, 2005 | Yoshikawa et al. |
| 6,933,167 | Aug. 23, 2005 | Yamamoto |
| 6,942,959 | Sep. 13, 2005 | Dubin et al. |
| 6,967,779 | Nov. 22, 2005 | Fadel et al. |
| 7,106,529 | Sep. 12, 2006 | Kerr et al. |
| 7,119,962 | Oct. 10, 2006 | Gurevich et al. |
| 7,184,090 | Feb. 27, 2007 | Toshimi Watanabe et al. |
| 7,187,502 | Mar. 6, 2007 | Gurevich et al. |

OTHER PUBLICATIONS

Land and Nilsson, "Animal-Eyes", Oxford University Press, 2002.

Duparré et al., "Artificial Apposition Compound Eyes Fabricated by Micro-Optics Technology", Applied Optics, August 2004, pp 4303-4310, vol. 43, No. 22.

Lee and Szema, "Inspirations from Biological Optics for Advanced Photonic Systems", Science, November 2005, pp 1148-1150, vol. 310, No. 5751.

It is an object of the invention to provide a system for generating wide field of view images without distortion.

It is another object of the invention to enable imaging at any depth of field without the need for focus adjustment.

It is another object of the invention to provide an optical imaging system that can be shaped conformally to any convex mounting surface geometry, whether it be spherical, aspherical, or cylindrical.

It is another object of the invention to provide a positive meniscus superposition lenslet array formed by two aligned, refracting lenslet arrays that together create a single, upright, high intensity optical image.

It is another object of the invention to enable curved refracting lenslet arrays, transmissive to visible light and infrared radition, to be manufactured at low cost using hot press molds.

It is a further object of the invention to enable a curved image to be transformed by a curved fiber optic imaging taper into a flat image for capture by flat visible wavelength detector arrays, infrared detector arrays, image intensifiers, and film.

SUMMARY OF THE INVENTION

In accordance with the present invention, there is provided a multiple aperture array imaging system with compound refractive optics modeled after the eyes of insects. Light enters through an outer, convex shaped array of lenslets that each focus a portion of the incident light beam. In the preferred embodiment an inner, concave shaped array of lenslets is aligned to the outer convex array to collimate the light as it leaves each lenslet. The lenslets of the two arrays are paired to operate as afocal Keplerian telescopes on a convex, meniscus form. The mensicus form is shaped so that the collimated light from hundreds of adjacent lenslets can be directed toward a common point on the convex surface of a fiber optic imaging taper. In this manner all of the lenslets work together to form a single, upright, high intensity image on top of the taper. The fibers in the taper transfer the image light by total internal reflection to the flat bottom of the taper to which is bonded a mosaic detector array. The taper therefore functions to transform the convex image formed by the lenslet arrays into a flat image that can be digitized by a flat detector array and its associated readout electronics.

The invention incorporates two components for blocking stray light. The first is a multiple aperture, convex spatial filter array positioned outside the lenslet array to prevent stray light from impinging on the interstices between lenslets. The spatial filter also serves to limit the off-axis height of the lenslet light beam, thereby sharpening the image by reducing optical aberrations. The spatial filter can consist of a light blocking coating formed around the edges of each lenslet, or it can be fabricated as a separate light blocking shell that is bonded to the lenslet array surface. The shell would contain small apertures that are aligned coaxially to the lenslet optical axes. The second component for blocking stray light is a louver baffle consisting of light absorbing honeycomb cells that are many times larger than the diameter of a lenslet. The baffle is attached to the concave side of the inner lenslet array and prevents stray light from exiting the array at large angles to form ghost images.

BRIEF DESCRIPTION OF THE DRAWINGS

A complete understanding of the present invention may be obtained by reference to the accompanying drawings, when considered in conjunction with the subsequent, detailed description, in which:

FIG. 9a is a table listing the optical prescription for a superposition array imaging system of the type illustrated in FIG. 1;

FIG. 9b is a schematic cross-sectional diagram depicting the components of the optical prescription listed in FIG. 9a;

FIG. 10 is a schematic cross-sectional view of an infrared superposition array imaging system with electronics representing an alternative embodiment to the visible wavelength system illustrated in FIG. 3a;

For purposes of clarity and brevity, like elements and components will bear the same designations and numbering throughout the Figures.

DETAILED DESCRIPTION OF THE INVENTION

Figure 1:
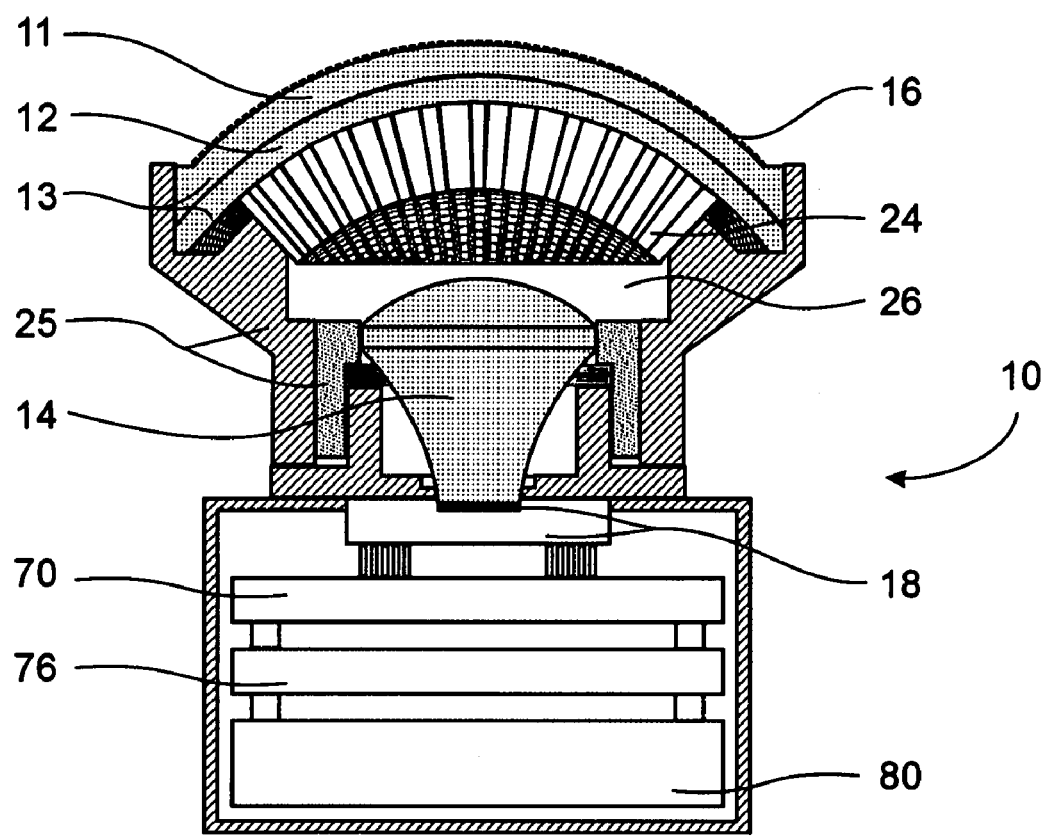
FIG. 1 is a cross-sectional view of a superposition array imaging system constructed in accordance with one embodiment of the invention.
Figure 2:
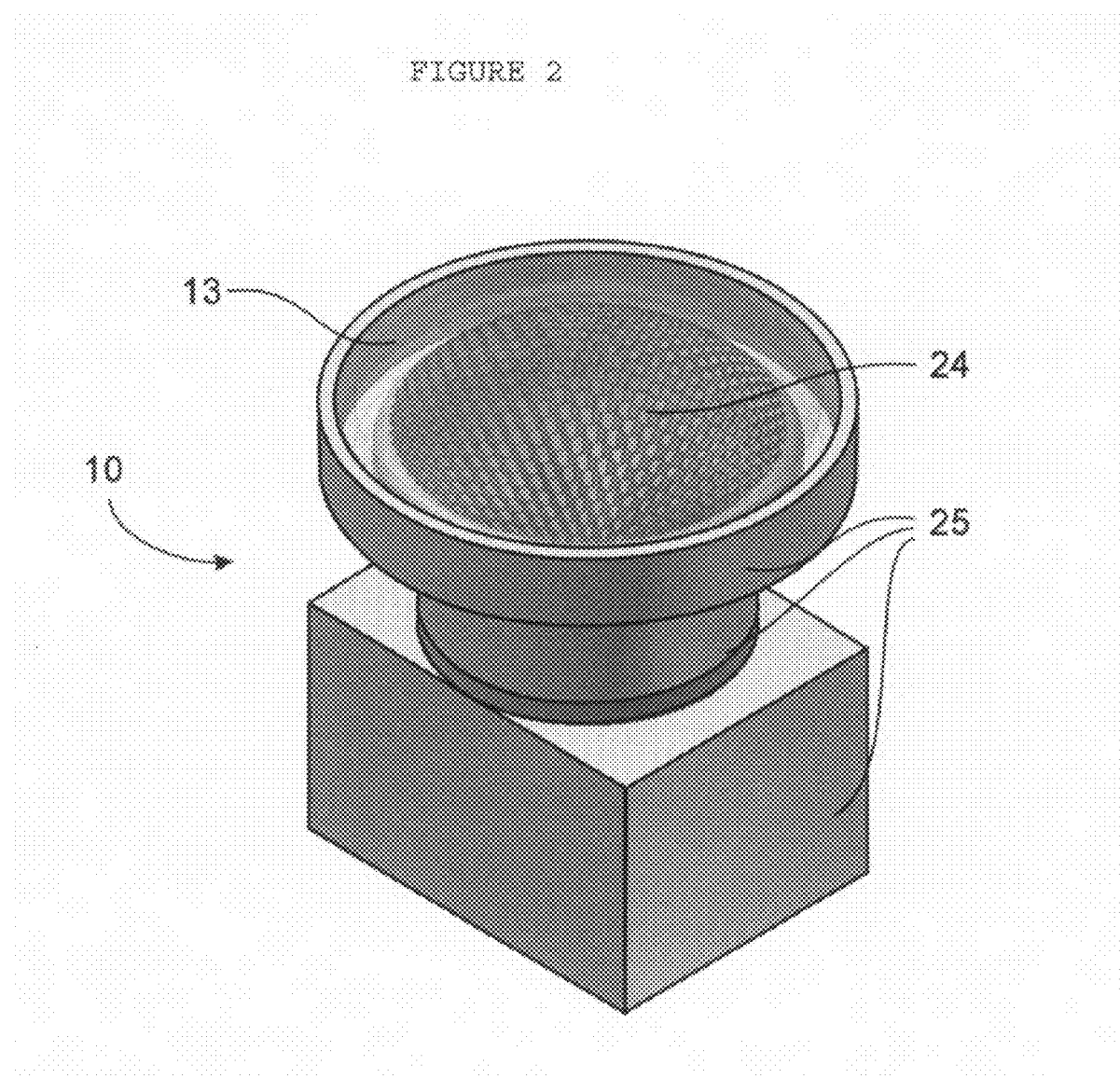
FIG. 2 is an isometric view of a superposition array imaging system of the type illustrated in FIG. 1.

Referring now to the drawings, FIG. 1 is a cross-sectional view of a superposition array imaging system 10, the preferred embodiment of the fiber coupled artificial compound eye invention. It includes a spatial filter array 16, a lenslet array 13, a louver baffle 24, a fiber optic imaging taper 14, and a mosaic detector array with readout electronics 18, all held rigidly in alignment by a mounting structure 25. The lenslet array 13 is shaped into a positive meniscus form consisting of an outer convex lenslet array 11 and an inner concave lenslet array 12. The spatial filter array 16 is made conformal to the convex lenslet array 11 and the louver baffle 24 is made conformal to the concave lenslet array 12. Between the louver baffle 24 and the fiber optic imaging taper 14 is a clear zone 26 in which can be placed a positive mensicus photo grey glass for controlling light intensity. The photogrey glass and the top of the fiber optic imaging taper 14 must be shaped to conform to the shape of the lenslet array 13. The bottom of the fiber optic imaging taper 14 must be shaped to match the shape of the mosaic detector array to which it is bonded. The preferred and most common detector array shape is flat because it is easiest to manufacture, but the system will perform as well with a curved detector array shape. If the detector array shape is curved to match the shape of the lenslet array 13, then the fiber optic imaging taper 14 can be removed. If the detector array shape is curved but does not match the shape of the lenslet array 13, then the taper must remain, with its bottom surface shaped to match the shape of the detector array surface. The readout electronics convert the image captured by the detector array into voltages that are digitized by the analog to digital converter electronics 70. The digitized image is then stored on a digital storage device 76. A power supply 80 is required to run the detector, readout electronics, and storage device. FIG. 2 is an isometric view of the superposition array imaging system 10 shown in FIG. 1, but with the spatial filter array 16 removed to enable a clear view through the lenslet array 13 to show the internal louver baffle 24 structure.

Figure 3A:
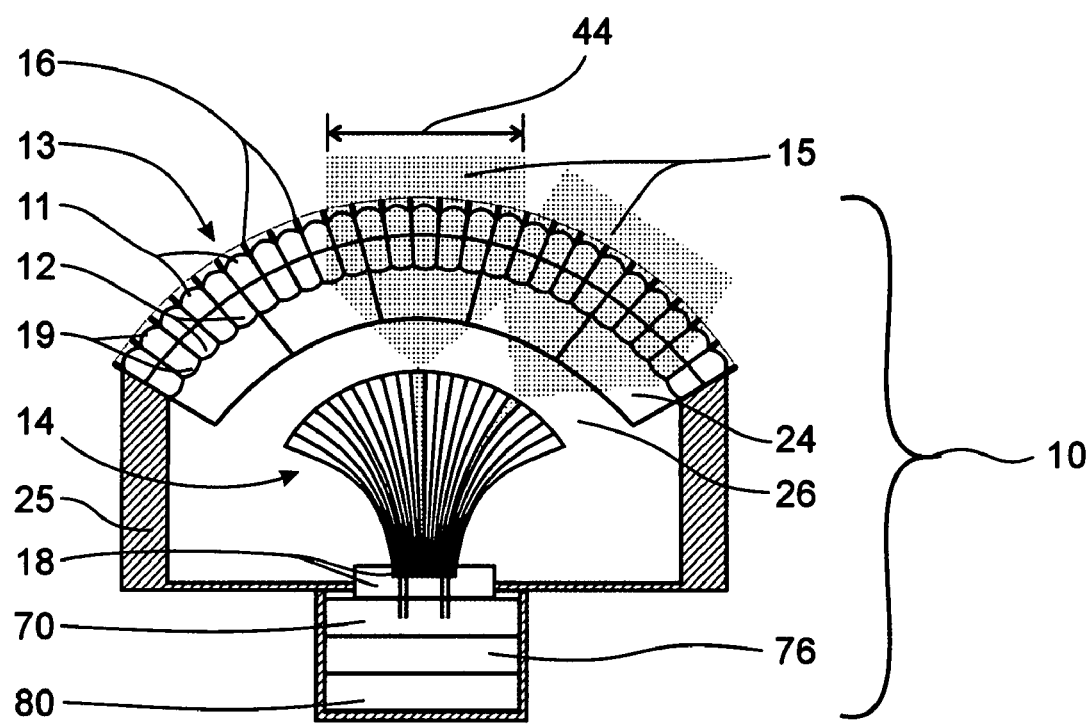
FIG. 3a is a schematic cross-sectional view of a superposition array imaging system of the type illustrated in FIG. 1.

FIG. 3a is a schematic cross-sectional view of a superposition array imaging system 10. The concept was derived from the compound eyes of nocturnal arthropods, such as moths and beetles, that superpose light from thousands of adjacent lenslets to maximize the intensity for low light level viewing. In the artificial compound eye, the effective superposition pupil diameter 44 is 10 to 20 times the diameter of a single refractive afocal lenslet pair 19, thereby increasing the superposed light intensity by 100 to 400 times the light intensity captured by a single lenslet or lenslet pair. The lenslets are formed into a positive meniscus shape to generate a curved, distortion free image on top of a convex detector surface. In a moth eye the lenslets are refracting crystalline cones, and the convex detector surface consists of absorbing rhabdom receptor cell layers. In the artificial compound eye the lenslet array 13 is made from refracting glass, and it forms a curved, distortion free image on top of a glass fiber optic imaging taper 14. The light from the image then propagates down the fibers until it reaches a flat mosaic detector array with readout electronics 18.

Figure 3B:
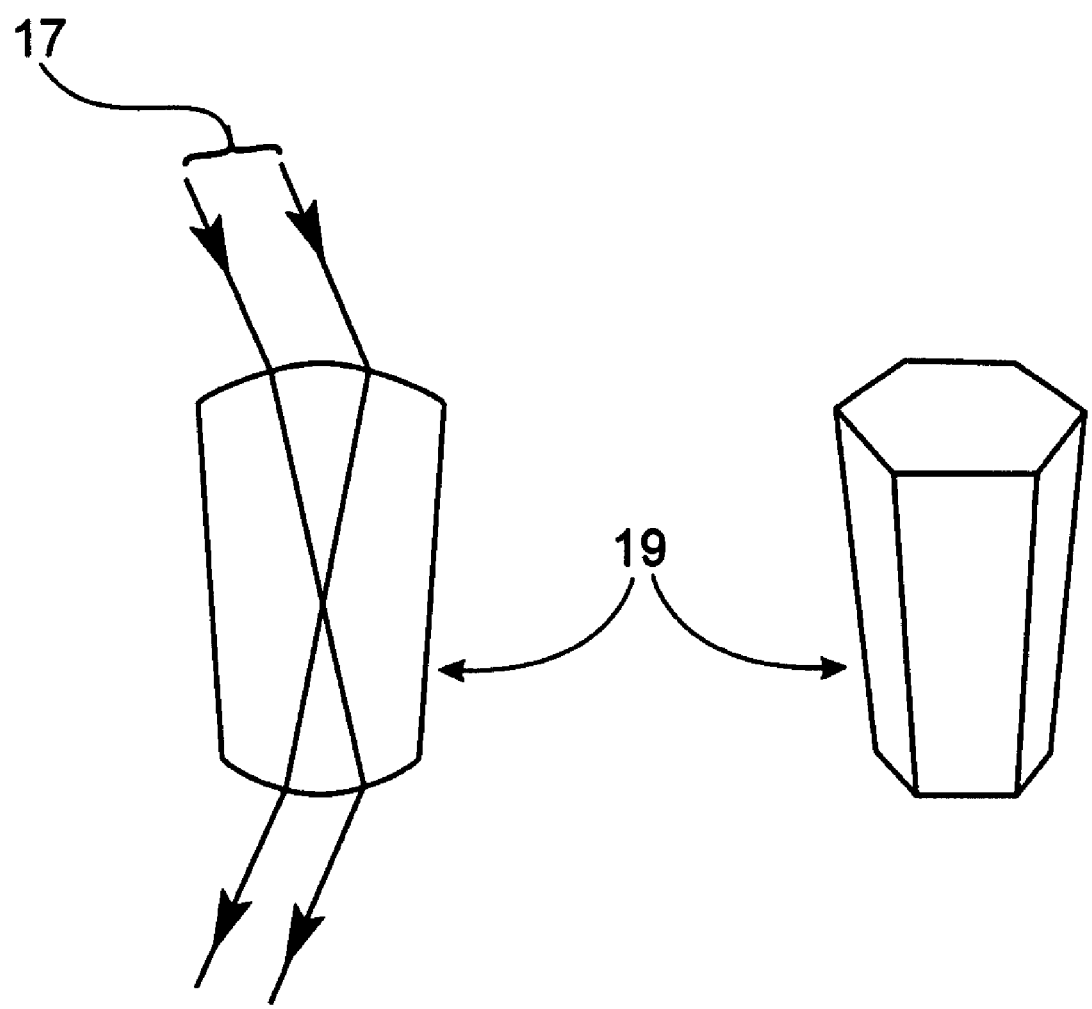
FIG. 3b is a schematic cross-sectional view of a refractive lenslet pair within a superposition array acting as an afocal, unity magnification keplerian telescope.

In both the artificial and natural refractive compound eyes the superposition light beam 15 impinges on the convex lenslet array 11 that focuses each lenslet light beam 17 before passing it to the concave lenslet array 12. The concave lenslet array 12 then collimates each lenslet light beam 17 and bends it at an angle opposite to which it entered. The concept is further illustrated in FIG. 3b, which shows a schematic representation of how two lenslets are combined to form a refractive afocal lenslet pair 19 of the superposition array. Each lenslet pair collimates the entering lenslet light beam 17 and redirects it at the proper angle.

Figure 4:
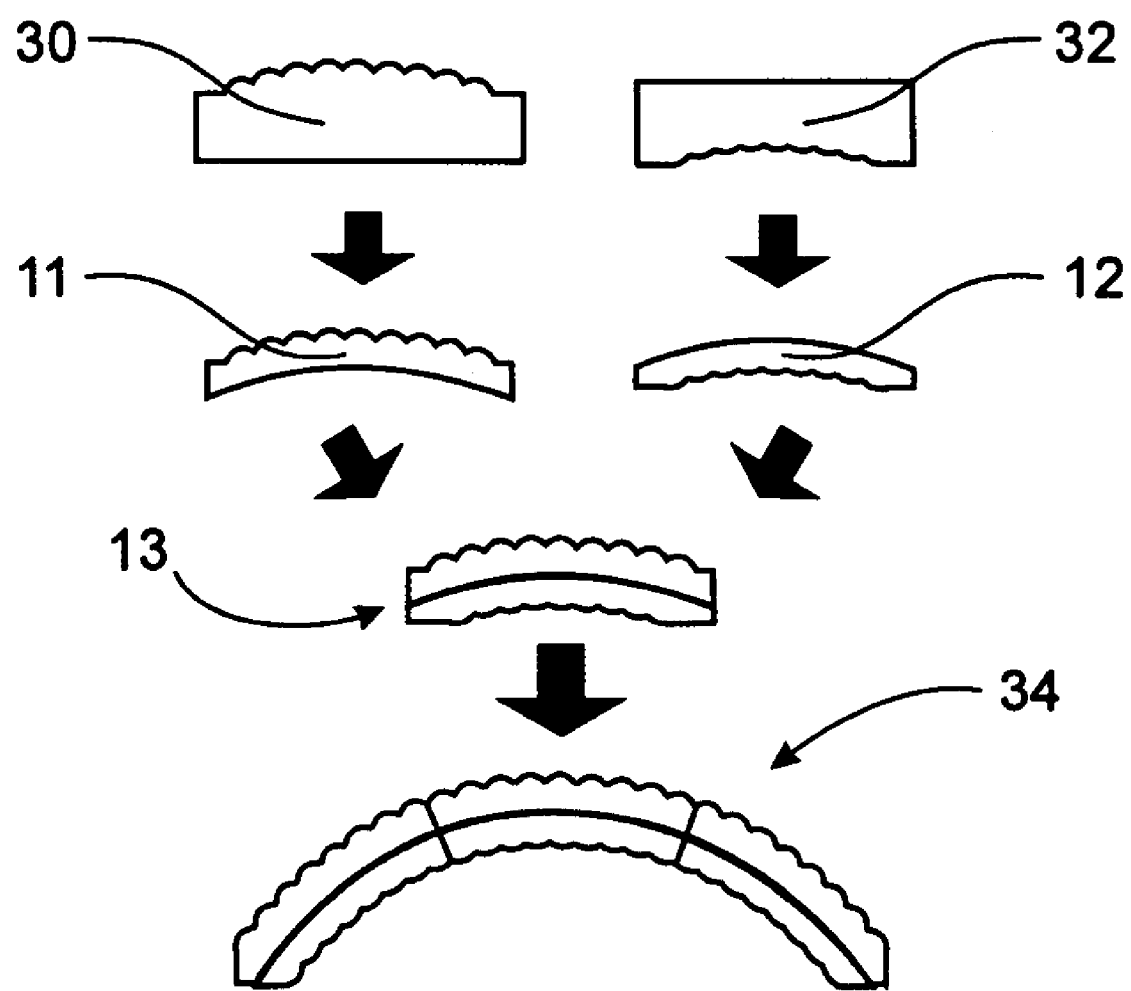
FIG. 4 is a schematic flow diagram showing the steps to fabricate refractive superposition lenslet arrays using the hot press mold technique.

FIG. 4 is a schematic flow diagram showing the steps to fabricate refractive superposition lenslet arrays using the hot press mold technique. Two hot press molds are required to generate the convex block of a hot press molded lenslet array 30, and two more hot press molds are required to generate the concave block of a hot press molded lenslet array 32. The flat side of the convex block is polished to make the convex lenslet array 11 into a meniscus shell. The flat side of the concave block is polished to make the concave lenslet array 12 into a matching meniscus shell. The polished surfaces of the two shells are then aligned and bonded together to form the finished lenslet array 13 subsection. The subsections can then be cut into rhomboid shapes and bonded into a lenslet array hemisphere formed from rhomboid subsections 34 to increase the field of view. The shape of the lenslet array 13 is convex and spherical in the preferred embodiment, but in alternative embodiments it can be aspherical or cylindrical or any geometrical shape that will enable it to conform to the shape of a particular mounting surface, such as a wing or a nose cone.

Figure 5:
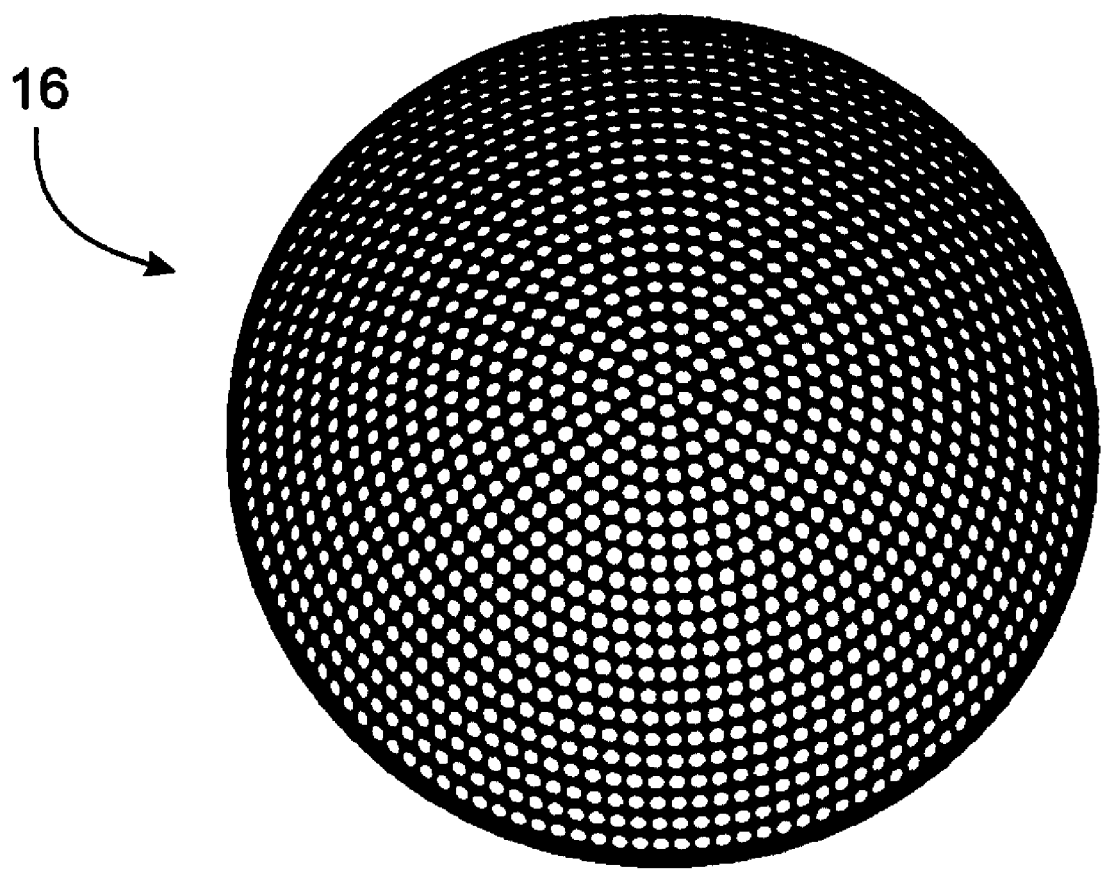
FIG. 5 is a top view of a spatial filter array of the type included in FIG. 1.

FIG. 5 is a top view of a spatial filter array 16. The spatial filter array 16 can either be a light absorbing coating formed around the edges of each lenslet of the convex lenslet array 11, or it can be a separate light blocking shell, with small apertures in it, that is aligned and bonded to the convex lenslet array 11. The shape of the spatial filter array 16 must conform to the shape of the convex lenslet array 11, and the centers of the apertures must be aligned to the centers of the lenslets. The aperture diameters are typically 80-90% of the lenslet diameters. The function of the spatial filter array 16 is to prevent the incoming light from impinging on the interstices between lenslets. It also limits the off-axis height of the lenslet light beam 17, thereby reducing optical aberrations.

Figure 6:
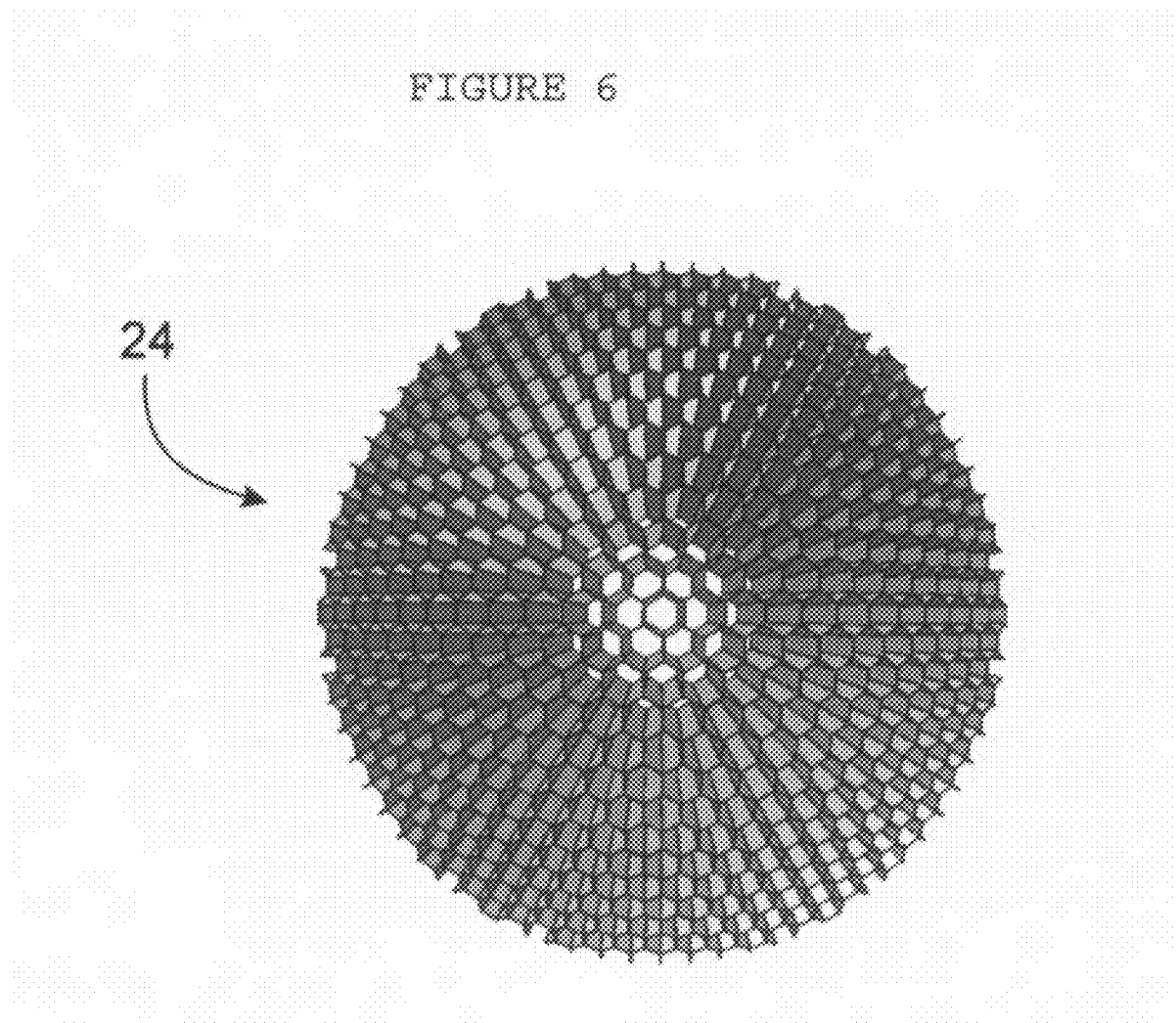
FIG. 6 is an isometric view of a honeycomb louver baffle of the type included in FIG. 1.

FIG. 6 is a top view of a louver baffle 24. The louver baffle 24 contains light absorbing honeycomb cells that are many times larger than the diameter of a lenslet. The shape of the louver baffle 24 must conform to the shape of the concave lenslet array 12. The function of the louver baffle 24 is to prevent stray light from exiting the concave lenslet array 12 at large angles and forming ghost images. A moth eye controls stray light by growing pigmentation cell layers along the walls of the crystalline cones. The pigmentation cell layers absorb stray light that enters the cones at large angles, and they absorb light that impinges on the interstices between cones, preventing the light from scattering into adjacent cones.

Figure 7:
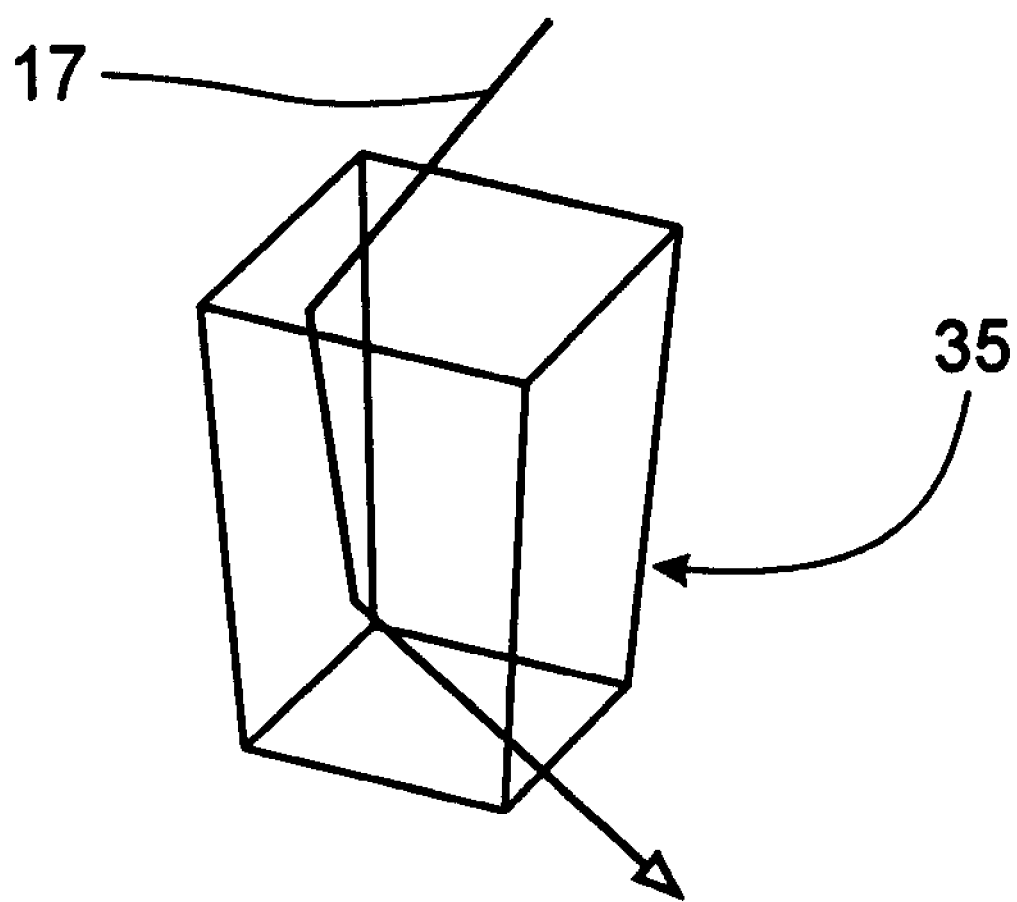
FIG. 7 is an isometric view of a box mirror cell within a reflective superposition array.

FIG. 7 is an isometric view of a box mirror cell 35 of a reflective superposition array similar to what is found in deep sea arthropods such as lobsters and crayfish. The reflecting box is able to redirect the incoming lenslet light beam 17 at the opposite angle it entered while keeping it collimated, so it functions in the same way as the refractive afocal lenslet pair 19. The box mirror cell 35 also serves as a baffle. In an alternative embodiment of the invention, a superposition array consisting of box mirror cells replaces the spatial filter array 16, the refracting superposition lenslet array 13, and the louver baffle 24. The box element approach not only has the advantage of combining three parts into a single structure, it can also operate at almost any wavelength. The structure is manufactured by laser stereo lithography and then coated in aluminum. The box shape of the cell is essential to obtain the required roof-mirror type reflection. But unlike hexagons, box shapes do not pack efficiently on curved surfaces, so some dead space results.

Figure 8:
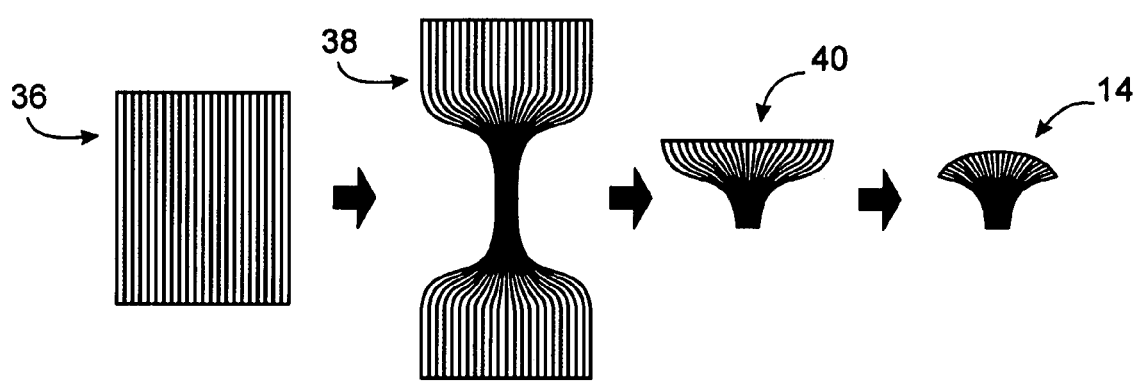
FIG. 8 is a schematic flow diagram showing the process steps to fabricate a convex shaped fiber optic imaging taper of the type included in FIG. 1.

FIG. 8 is a schematic flow diagram showing the process steps to fabricate a convex shaped fiber optic imaging taper 14, an essential part of the artificial system that has no counterpart in nature. In the preferred embodiment of the artificial system, the taper transforms the curved image into a flat one so that a flat mosaic detector array can be used to capture the image. The natural arthropod eye system has a convex detection surface, which obviates the need for a curved, taper-like conduit. In the artificial system a curved detector can be used to eliminate the fiber optic imaging taper 14 if the detector curvature matches the form of the lenslet array 13. The fabrication of the taper begins with an aligned bundle of straight glass fibers that are heated to form a fused imaging fiber conduit 36. The fused conduit is then heated near the center and pulled to form a drawn double-taper imaging fiber conduit 38 that is cut into two pieces. The ends of each piece are cut again to reduce the length, resulting in the cut imaging fiber taper 40 shown in FIG. 8. The small end is polished flat; the large end is ground into a dome shape and then polished to form the finished fiber optic imaging taper 14. It is critical that the taper be ground down to the point at which the ends of the fibers point normal to the surface of the dome. The ends of the fibers will then be flat rather than beveled. If the ends are beveled, then light arriving at the proper angle to the dome surface will be refracted toward the fiber cladding rather than the fiber core. Also, stray light arriving at an incorrect angle to the dome could be captured by the fiber core instead of absorbed by the fiber cladding.

Figure 9B:
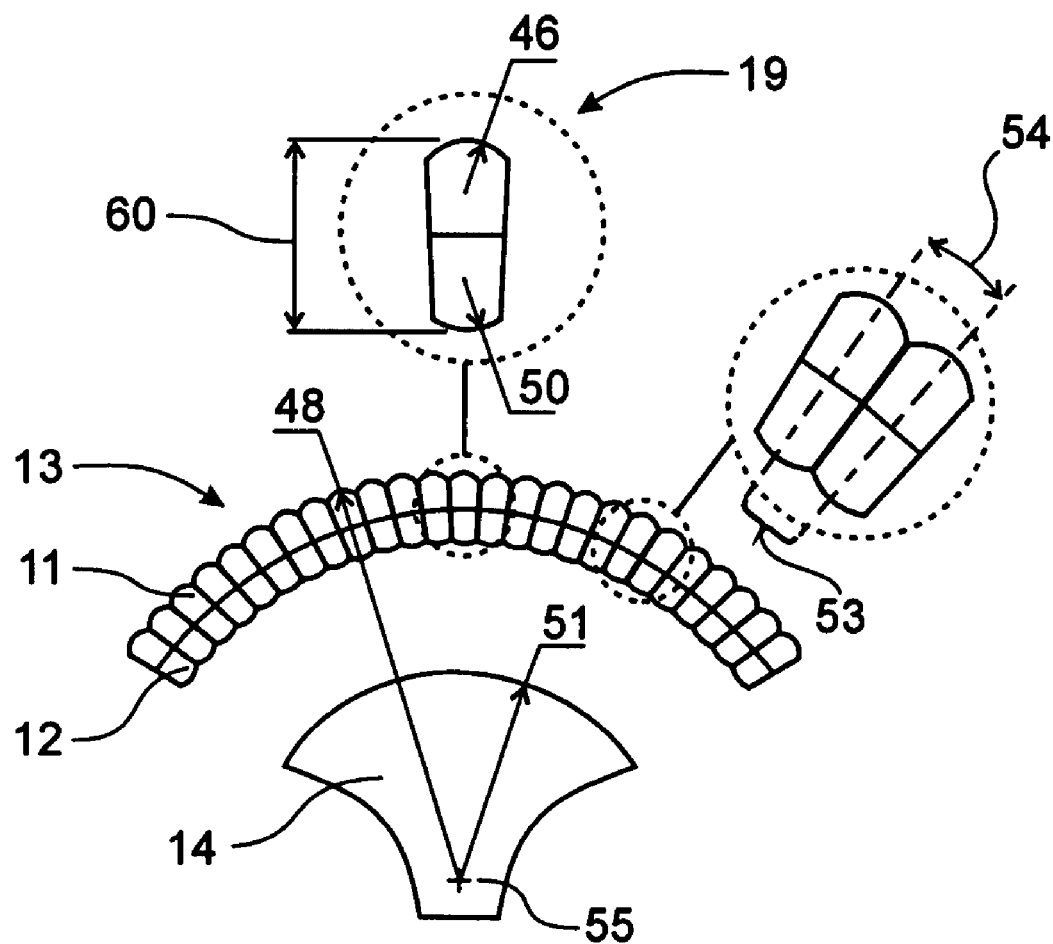

FIG. 9a is a table listing the optical prescription for a superposition array imaging system 10 defined by the schematic cross-sectional diagram shown in FIG. 9b. The superposition pupil diameter 44 is determined by the number of lenslets in a cluster that can redirect the incoming lenslet light beam 17 to a single image point on the surface of the fiber optic imaging taper 14. The pupil diameter can be increased or decreased by changing the honeycomb cell pitch and depth within the louver baffle 24. The lenslet radius of a convex array shell 46, the lenslet radius of a concave array shell 50, and the total lenslet length inside the superposition array 60 are sized to ensure that for a given substrate material refractive index, the incoming light is focused between the two surfaces and recollimated upon leaving the concave lenslet array 12. For the optical prescription listed, the substrate material is B270 Schott glass. The design is set so that the outer radius of the convex array shell 48 minus the total lenslet length inside the superposition array 60 is equal to twice the curvature radius of the convex surface on the imaging taper 51. This ensures that light entering a cluster of lenslets at the same angle will exit the lenslets at the opposite angle and converge to the same point on the surface of the fiber optic imaging taper 14. The system focal length is therefore equal to the curvature radius of the convex surface on the imaging taper 51. The outer radius of the convex array shell 48 is set by its distance to the common nodal point at the center of curvature 55. Each lenslet optical axis 53 passes through the same nodal point at the center of curvature 55. The angle between these two axes defines the lenslet optical axis angle of a superposition array 54.

Figure 9C:
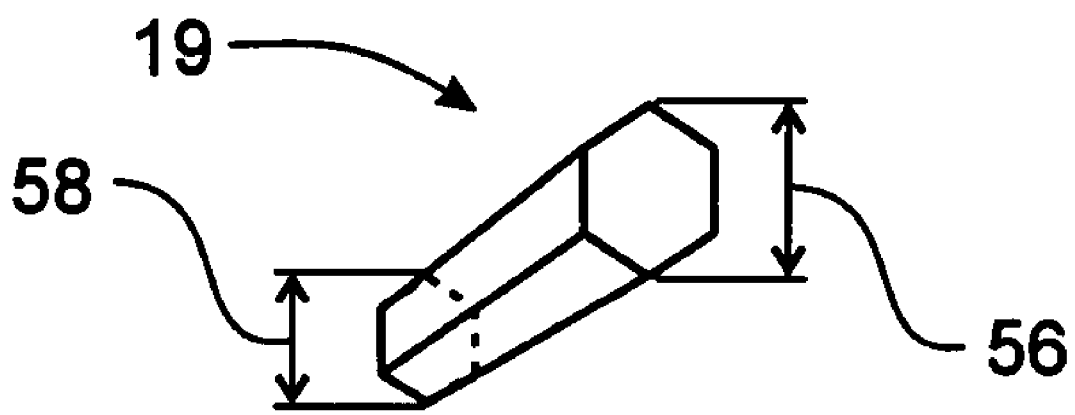
FIG. 9c is a top perspective view of a refractive afocal lenslet pair within the superposition lenslet array illustrated in FIG. 9d showing the peak-to-peak hexagon lenslet widths.

FIG. 9c is a top perspective view of a refractive afocal lenslet pair 19 within a superposition lenslet array 13 showing the convex array's peak-to-peak lenslet hexagon width 56 and the corresponding concave array's peak-to-peak lenslet hexagon width 58.

Figure 9D:
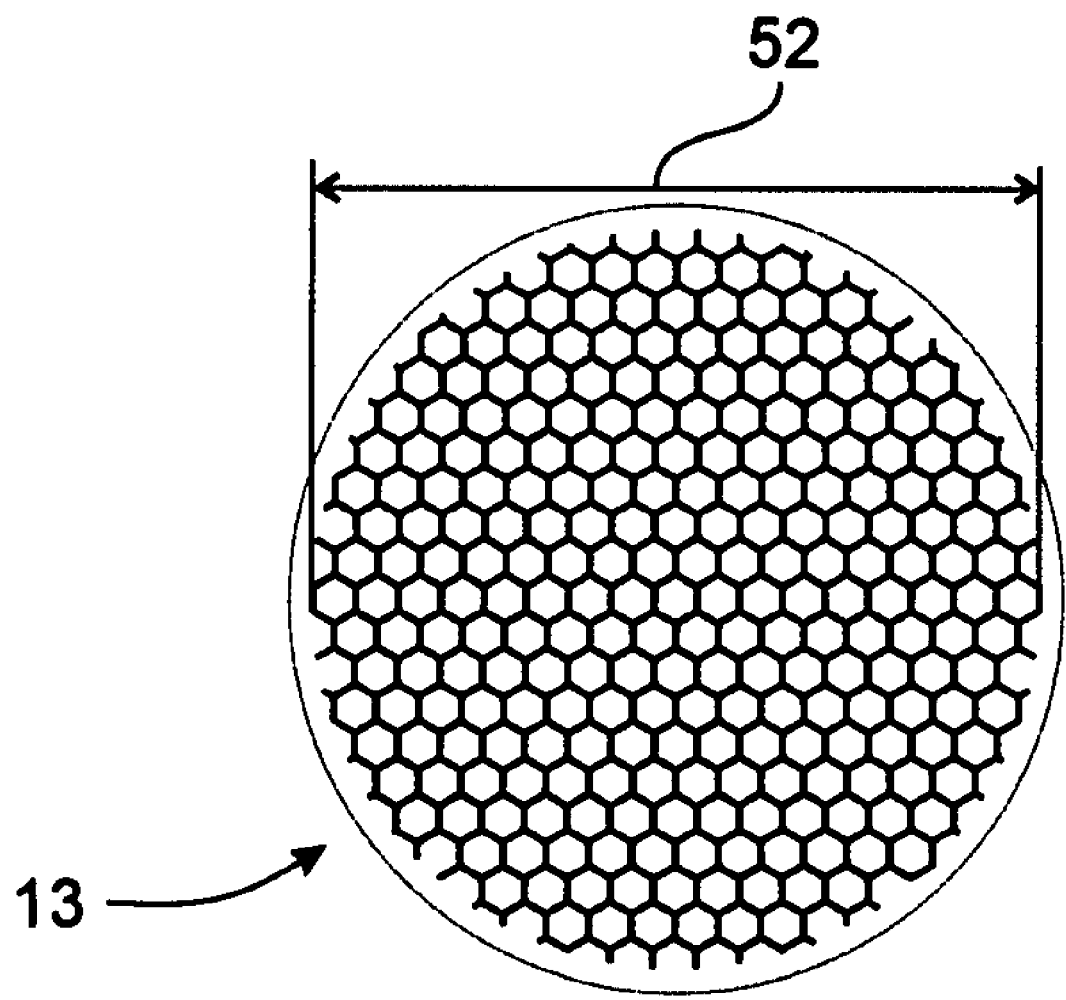
FIG. 9d is a schematic axial section of the superposition lenslet array in FIG. 9b showing its base diameter.

FIG. 9d is a schematic axial section of a superposition lenslet array 13 showing its base diameter. The system field of view is equal to two times the arc sine of the ratio of the superposition array lens base diameter 52 to twice the outer radius of the convex array shell 48. The field of view in the present design is 90 degrees.

Figure 10:
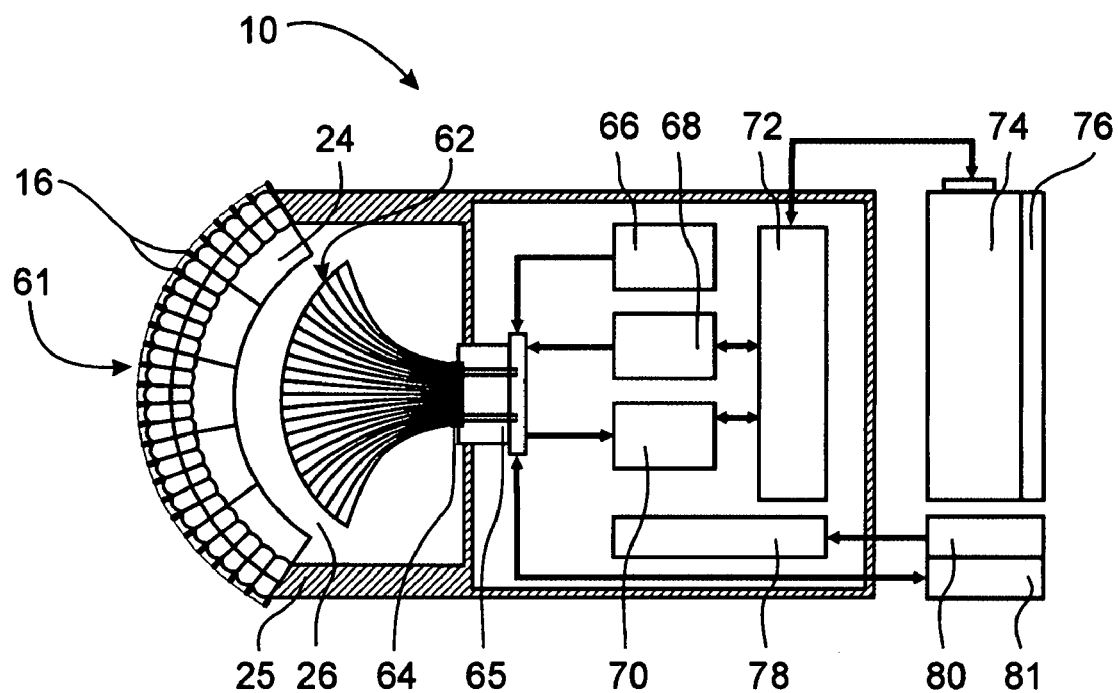

FIG. 10 is a schematic diagram of an infrared superposition array imaging system 10, an alternative embodiment of the fiber coupled artificial compound eye invention. The incoming infrared radiation passes through an infrared superposition lenslet array 61 made from an infrared transmitting amorphous glass that can be hot press molded. One such material is the chalcogenide glass GeAsSe. The infrared superposition lenslet array 61 generates a convex image on the top of the convex shaped capillary fiber imaging taper 62, which transfers the image to a two-dimensional infrared detector array 64 to which it is bonded. The convex shaped capillary fiber imaging taper 62 is manufactured following the steps outlined in FIG. 8, but with three additional steps. The hollow capillary fibers that form the cut imaging fiber taper 40 are filled with paraffin before the taper is ground at the large end to form the convex shape. Then a chemical is used to etch away the paraffin. For efficient infrared transmission, the hollow capillary fibers are either coated internally with silver and a cyclic olefin polymer, or they are filled with an infrared transmitting liquid. In the coated case, transmission is by grazing incidence reflection, which results in a low numerical aperture for the fiber. The numerical aperture is increased by filling the capillary fibers with a liquid of higher refractive index than the fiber's index.

The infrared detector array can be cooled by a thermo-electric cooler 65 to improve its sensitivity and to maintain uniformity across it. The infrared radiation, upon entering the pixels in the detector array, is converted into a voltage that is readout by the detector readout electronics. The detector is controlled by electronics to generate detector bias voltages 66 and electronics to generate detector clocks 68. The video voltages are digitized using analog to digital converter electronics 70. Digital interface electronics 72 are used to transfer the image bits to the frame grabber and processor electronics 74. The processed image is then stored in a digital storage device 76. The power supply 80 for the detector and electronics is controlled by the power regulator electronics 78. A separate set of cooler electronics 81 regulates power to the thermo-electric cooler 65. The power supply 80 can be a battery.

Figure 11:
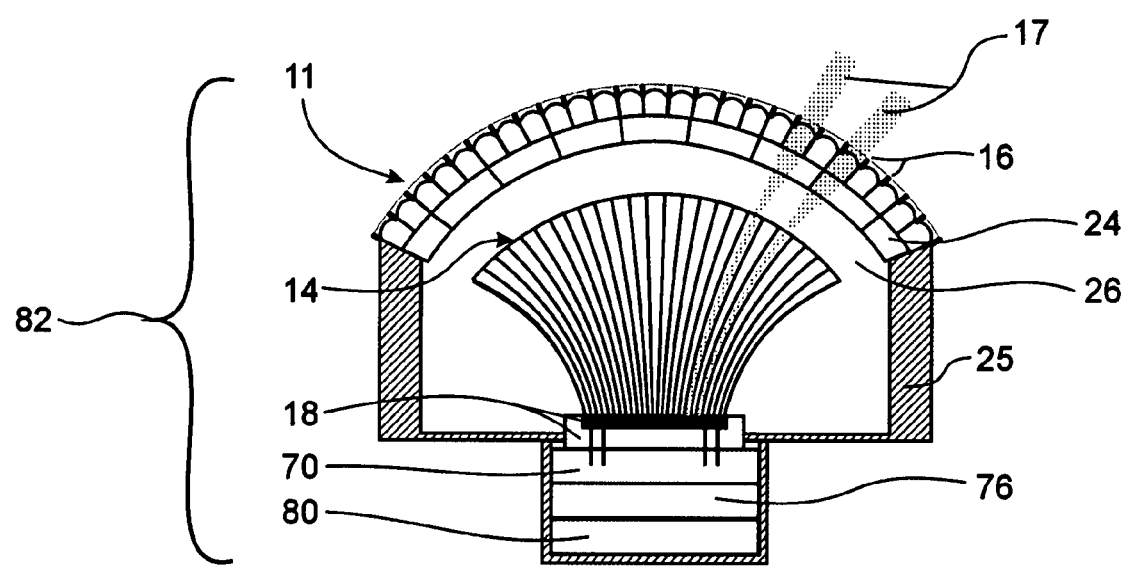
FIG. 11 is a schematic cross-sectional view of an apposition array imaging system, an alternative embodiment of the fiber coupled artificial compound eye invention.

FIG. 11 is a schematic cross-sectional view of an apposition array imaging system 82, an alternative embodiment of the fiber coupled artificial compound eye invention. This embodiment is derived from the eyes of diurnal arthropods, such as bees, flies, and butterflies, which have apposition lenslet arrays wherein each lenslet operates independently from the others in the array. The effective pupil diameter is equal to the diameter of the individual lenslet. This sharpens the image resolution at a cost to light collection efficiency. The fundamental design difference between the apposition array system shown in FIG. 11 and the superposition array system shown in FIG. 3a is that the apposition system does not have an internal concave lenslet array 12 to recollimate each lenslet light beam 17. Hence the radius of curvature of the lenslets in the convex lenslet array 11 in the apposition array imaging system 82 must be large enough to focus each lenslet light beam 17 directly onto the convex surface of the fiber optic imaging taper 14 after passing it through the louver baffle 24 and clear zone 26. In diurnal arthropods the lenslets are crystalline cones that are almost in contact with the rhabdom receptor cell layers. There is not a large clear zone 26 or anything resembling an extended louver baffle 24. Stray light is controlled by iris pigment cell layers surrounding the crystalline cones.

Figure 12:
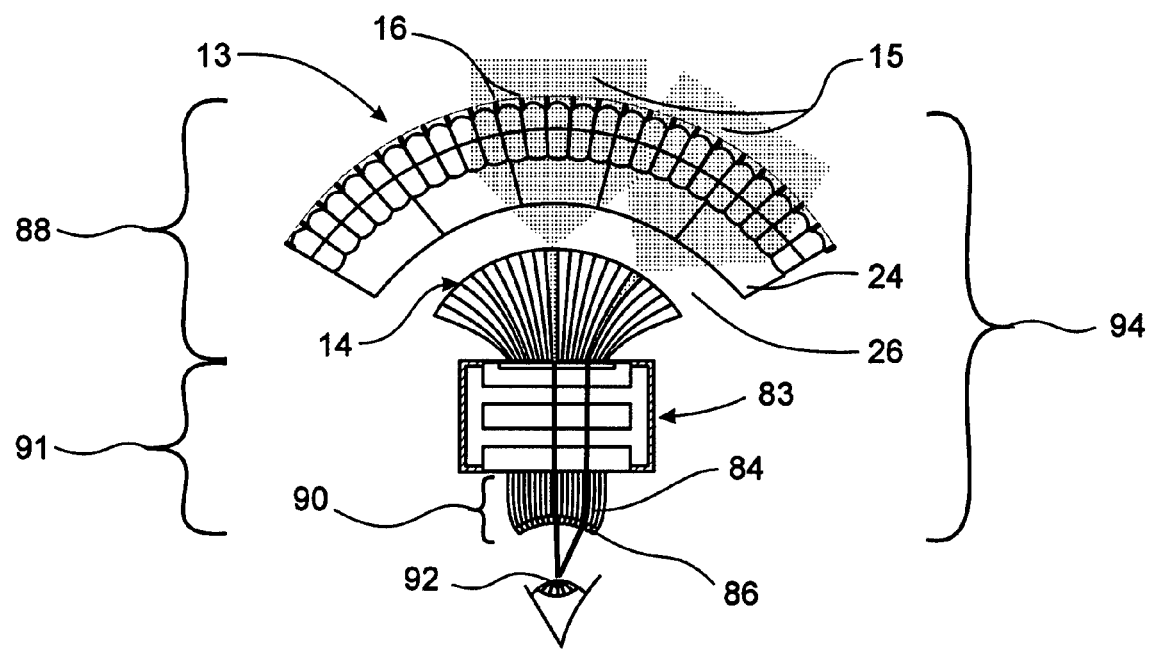
FIG. 12 is a schematic cross-sectional view of a hybrid superposition—reverse apposition array night vision imaging system, an alternative embodiment of the fiber coupled artificial compound eye invention.

FIG. 12 is a schematic cross-sectional view of a hybrid superposition—reverse apposition array night vision imaging system 94, an alternative embodiment of the fiber coupled artificial compound eye invention. The system combines a fiber coupled superposition array objective 88 with an image intensifier with fiber optic faceplate and eyepiece 91, the eye piece being of a reverse apposition array design. The objective includes a spatial filter array 16, a refractive superposition lenslet array 13, a clear zone 26, a honeycomb louver baffle 24, and a convex shaped fiber optic imaging taper 14. The objective is bonded to the image intensifier with fiber optic faceplate 83, which multiplies the photon count of the flat, upright image (the upright orientation of the image eliminates the need for a fiber optic inverter, which is normally required in image intensified night vision systems). The intensified upright image is then captured by a fiber coupled concave lenslet array eye piece 90 consisting of a concave fiber optic imaging taper 84 coupled to a concave reverse apposition lenslet array 86. The flat end of the imaging taper is bonded to the output side of the image intensifier to transform the flat image into a concave image. The concave image is then captured by the meniscus shaped, concave reverse apposition lenslet array 86. The polished convex side of the meniscus is bonded to the matching concave end of the taper. The concave, reverse configuration of an apposition array is not found in nature. Each lenslet collimates the light it receives from the fibers for viewing by the human eye. The curvature of the concave form is designed so that the collimated beams converge 20 mm away at the pupil of the human eye 92. If the field of view is very wide, then the convergence zone can be moved to 30 mm away so that it lines up with the eye ball's center of rotation. This allows the eye to roll to see the entire field of view.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A fiber coupled artificial compound eye for generating wide angle images at any depth of field without distortion and without the need for focus adjustment, comprising:
    means for blocking multiple off-axis light paths to improve image sharpness;
    means for channeling multiple paraxial light paths to form an image on a convex surface, optically conformed to said means for blocking multiple off-axis light paths to improve image sharpness;
    means for eliminating ghost images and stray light, rigidly conformed to said means for channeling multiple paraxial light paths to form an image on a convex surface; and
    means for transforming a convex image into a flat image, optically coupled to said means for eliminating ghost images and stray light.

2. The fiber coupled artificial compound eye in accordance with claim 1, wherein said means for blocking multiple off-axis light paths to improve image sharpness comprises a spatial filter array, having an array of apertures on a convex surface aligned coaxially to an array of lenslets.

3. The fiber coupled artificial compound eye in accordance with claim 1, wherein said means for channeling multiple paraxial light paths to form an image on a convex surface comprises a meniscus shaped lenslet array, having lenslets on the convex surface.

4. The fiber coupled artificial compound eye in accordance with claim 1, wherein said means for eliminating ghost images and stray light comprises a meniscus shaped louver baffle, having honeycomb cells made from light absorbing material.

5. The fiber coupled artificial compound eye in accordance with claim 1, wherein said means for transforming a convex image into a flat image comprises a fiber optic imaging taper, being convex shaped at the large end and flat shaped at the small end.

6. A fiber coupled artificial compound eye for generating wide angle images at any depth of field without distortion and without the need for focus adjustment, comprising:
    a spatial filter array, having an array of apertures on a convex surface aligned coaxially to an array of lenslets, for blocking multiple off-axis light paths to improve image sharpness;
    a meniscus shaped lenslet array, having lenslets on the convex surface, for channeling multiple paraxial light paths to form an image on a convex surface, optically conformed to said spatial filter array;
    a meniscus shaped louver baffle, having honeycomb cells made from light absorbing material, for eliminating ghost images and stray light, rigidly conformed to said lenslet array; and
    a fiber optic imaging taper, being convex shaped at the large end and flat shaped at the small end, for transforming a convex image into a flat image, optically coupled to said louver baffle.

7. The fiber coupled artificial compound eye as recited in claim 6, further comprising:
    a mosaic detector array with readout electronics, for capturing and storing digital images, adhesively bonded to said fiber optic imaging taper.

8. The fiber coupled artificial compound eye as recited in claim 6, further comprising:
    an image intensifier with fiber optic faceplate and eyepiece, for amplifying low intensity light images and making them visible to the human eye, adhesively bonded to said fiber optic imaging taper.

9. The fiber coupled artificial compound eye as recited in claim 6, wherein said lenslet array has characteristics selected from the following group: hot press molded, having a second set of collimating lenslets on the concave surface aligned to the first lenslets to form a superposition array, being transmissive to visible light, and being transmissive to infrared radiation.

10. The fiber coupled artificial compound eye as recited in claim 6, wherein said fiber optic imaging taper has characteristics selected from the following group: having solid core fibers, and having capillary fibers.

11. The fiber coupled artificial compound eye as recited in claim 7, wherein said lenslet array has characteristics selected from the following group: hot press molded, having a second set of collimating lenslets on the concave surface aligned to the first lenslets to form a superposition array, being transmissive to visible light, and being transmissive to infrared radiation.

12. The fiber coupled artificial compound eye as recited in claim 7, wherein said fiber optic imaging taper has characteristics selected from the following group: having solid core fibers, and having capillary fibers.

13. The fiber coupled artificial compound eye as recited in claim 8, wherein said lenslet array has characteristics selected from the following group: hot press molded, having a second set of collimating lenslets on the concave surface aligned to the first lenslets to form a superposition array, being transmissive to visible light, and being transmissive to infrared radiation.

14. The fiber coupled artificial compound eye as recited in claim 8, wherein said fiber optic imaging taper has characteristics selected from the following group: having solid core fibers, and having capillary fibers.

15. The fiber coupled artificial compound eye as recited in claim 7, wherein said mosaic detector array with readout electronics has characteristics selected from the following group: being sensitive to visible light, and being sensitive to infrared radiation.

16. The fiber coupled artificial compound eye as recited in claim 11, wherein said mosaic detector array with readout electronics has characteristics selected from the following group: being sensitive to visible light, and being sensitive to infrared radiation.

17. The fiber coupled artificial compound eye as recited in claim 12, wherein said mosaic detector array with readout electronics has characteristics selected from the following group: being sensitive to visible light, and being sensitive to infrared radiation.

18. The fiber coupled artificial compound eye as recited in claim 13, wherein said image intensifier with fiber optic faceplate and eyepiece is an eyepiece constructed from fiber optics coupled to a concave lenslet array.

19. A fiber coupled artificial compound eye for generating wide angle images at any depth of field without distortion and without the need for focus adjustment, comprising:

a spatial filter array, having an array of apertures on a convex surface aligned coaxially to an array of lenslets, for blocking multiple off-axis light paths to improve image sharpness;

a meniscus shaped, hot press molded lenslet array, being transmissive to visible light and transmissive to infrared radiation and having lenslets on the convex surface and a second set of collimating lenslets on the concave surface aligned to the first lenslets to form a superposition array, for channeling multiple paraxial light paths to form an image on a convex surface, optically conformed to said spatial filter array;

a meniscus shaped louver baffle, having honeycomb cells made from light absorbing material, for eliminating ghost images and stray light, rigidly conformed to said lenslet array;

a fiber optic imaging taper, being convex shaped at the large end and flat shaped at the small end and having solid core fibers and capillary fibers, for transforming a convex image into a flat image, optically coupled to said louver baffle;

a mosaic detector array with readout electronics, being sensitive to visible light and sensitive to infrared radiation, for capturing and storing digital images, adhesively bonded to said fiber optic imaging taper; and an image intensifier with fiber optic faceplate and eyepiece, being an eyepiece constructed from fiber optics coupled to a concave lenslet array, for amplifying low intensity light images and making them visible to the human eye, adhesively bonded to said fiber optic imaging taper.

* * * * *